United States Patent [19]

Ryan et al.

[11] Patent Number: 5,387,623
[45] Date of Patent: Feb. 7, 1995

[54] BIODEGRADABLE ADHESIVE PACKAGING

[75] Inventors: Lisa L. Ryan, Dayton, Minn.; Alain Rouyer, Boos; Emmanuelle Pariente, Rouen, both of France; Peter Yeboa-Kodie, Luneburg, Germany

[73] Assignee: H. B. Fuller Company, Vadnais Heights, Minn.

[21] Appl. No.: 909,566

[22] Filed: Jun. 6, 1992

Related U.S. Application Data

[63] Continuation-in-part of Ser. No. 738,176, Jul. 30, 1991, abandoned.

[51] Int. Cl.$^6$ ................................................ C08K 5/10
[52] U.S. Cl. ..................................... 523/124; 523/125; 523/126; 523/127; 523/128; 428/378
[58] Field of Search ............... 428/378, 332; 523/124, 523/125, 126, 127, 128

[56] References Cited

U.S. PATENT DOCUMENTS

| | | | |
|---|---|---|---|
| 3,723,035 | 3/1973 | Frank | 425/71 |
| 4,337,181 | 6/1982 | Otey et al. | 523/128 |
| 4,503,098 | 3/1985 | Potts | 427/394 |
| 5,180,765 | 1/1993 | Sinclair | 524/308 |

Primary Examiner—Edward Cain
Attorney, Agent, or Firm—Merchant, Gould, Smith, Edell, Welter & Schmidt

[57] ABSTRACT

A method and composition of packaging an adhesive composition, especially a thermoplastic or thermosetting hot melt adhesive. The method comprises the steps of providing one substantially uniform separate portion of the adhesive composition; sufficiently solidifying said portion for packaging; and substantially completely surrounding said sufficiently solidified portion with a biodegradable polymeric packaging material. The packaging material being meltable together with the adhesive composition and blendable into said molten adhesive composition, the kind and amount of said biodegradable packaging material being chosen so as not to disadvantageously affect the properties of the adhesive composition when blended into the molten adhesive and applied to a substrate.

18 Claims, No Drawings

BIODEGRADABLE ADHESIVE PACKAGING

This is a continuation-in-part of U.S. patent application Ser. No. 07/738,176, filed Jul. 30, 1991, now abandoned.

FIELD OF THE INVENTION

The present invention relates to a method of packaging an adhesive composition, especially a thermoplastic or thermosetting hot melt adhesive, in a biodegradable package which doesn't separate and/or degrade upon exposure to conditions present in the adhesive application equipment.

BACKGROUND OF THE INVENTION

Thermoplastic adhesives, especially hot melts, can be confectioned and packaged as disclosed in German patent 22 48 046. Hot melt adhesive is squeeze-cut into roughly pillow-shaped pieces, the pieces are subsequently cooled and thus solidified and are then put into sacks or cartons for packaging.

In order to reduce the tendency of the individual pillows to stick, i.e. adhere to each other, it is known to coat them with a separating, anti-stick substance, such as wax or a polymer, as shown in DE 33 27 289 Kaiser. WO 84/03457 and WO 84/03468, Societe Nouvelle Raffinerie Meridionale de Ceresines-Belix, disclose a method to outwardly coat autoprotected blocks with a powdery separating agent. For thermoplastic adhesive compositions with a relatively high softening point (above 120° C. and especially above 150° C.) these coatings provide sufficient anti-stick properties. Such compositions can therefore be packaged, stored and dispensed from sacks without any major sticking problems.

Another packaging for adhesive compositions is to wrap or cast bigger portions of the adhesive in plastics film material, such as thick polyethylene film. These known packagings have the disadvantage that the thermoplastic adhesive composition must be removed from the packaging prior to use, which means an extra handling step. Further, the packaging material must be discarded after emptying, which leads to material waste and expenditure for disposing of the used packaging material.

German patent 36 25 358 to Hausdorf discloses a method to completely wrap a single solid hot melt adhesive material block in a thermoplastic, especially a copolyamide film material with a melting point between 120° C. and 150° C., to prevent sticking of the adhesive to the internal surfaces of a melting apparatus when pressure-melting the adhesive. The film material is melted and mixed with the adhesive. This prior art centers on copolyamide materials in view of their inherent hot melt adhesive properties. Today, application temperatures of less than 150° C., preferably in the range of 110° C. to 140° C. are required by the end user to reduce thermal degradation problems of the adhesive as well as distortion of the substrates used. Therefore, for most applications, copolyamide films are not advantageous in view of their high melting points and problems encountered in homogeneously melting and mixing such materials together with customary hot melt adhesives.

U.S. Pat. No. 4,337,181 discloses film forming formulations comprising starch based films which can be blown into films and used as biodegradable films.

U.S. Pat. No. 4,503,098 discloses disposable articles made from water soluble polymers. The water soluble polymers include poly (alkylene oxide), hydroxyethyl cellulose, hydroxypropyl cellulose, polyvinyl alcohol, polyvinyl pyrrolidone polyacrylamide, polyacrylic acid, poly(vinyl methyl ether-co-maleic anhydride) with a degradable water-insoluble polymer selected from cyclic ester polymer, a poly $\beta$ hydroxy butyrate, a dialkanoyl polymer, or an ethylene polymer.

The modes of biodegradation of plastics was studied in an article entitled *Degradable Plastics, Materials Forum* (1989) 13, 1-10, M. J. Robey, G. Field and M. Styzinski. Many uses of biodegradable polymers including those in the medical science area were highlighted.

However, to date, there has not been a satisfactory solution proposed for a biodegradable packaging for pillowed adhesives as described above.

There is a need in the industry for a packaging material which exhibits biodegradability. If such a package were available, the packaged hot melt pillows would be opened, the hot melt pillows would be poured into the premelt tank, and the film package could be discarded in the trash receptacle. The spent packages would then be transported to a compost facility. The previous films would often take years to break down into components small enough to be digested by bacteria. Thus, from an environmental standpoint, it is advantageous to have a film which biodegrades as quickly as possible.

It is an object of this invention to provide an adhesive package which is biodegradable. Biodegradability is generally defined as a product which breaks down and is physically and substantially consumed by microorganisms under conditions typically present in waste composting processes.

A further problem encountered with some previous films includes noncompatibility with the packaged adhesive when the bag is incorporated with the molten adhesive. Upon melting of the packaged adhesive, the molten film does not form a substantially homogeneous mixture with the molten adhesive. Thus, when the film does not become assimilated into the adhesive, the film can separate and degrade upon heating and can create problems with the hot melt application equipment. By the term "degrade" it is meant an unassimilated portion of the film gels, chars, or skins upon exposure to heat. The resultant mixture can clog nozzles and guns of hot melt application equipment. Thus, it is an important object of this invention to provide a film which blends into the molten adhesive and does not gel, separate or degrade upon heating of the molten adhesive with the dissolved package.

It is a further object of this invention to limit any change in viscosity of the molten adhesive when the film mixes with the adhesive. It is critical in many applications to have minimal changes in the viscosity, and thus the bag should not adversely effect the viscosity.

To attain these and other objects and advantages, a method of packaging an adhesive composition with a biodegradable film is shown as well as criteria for the selection of the biodegradable films.

SUMMARY OF THE INVENTION

The present invention comprises the steps of providing one substantially uniform separate portion of an adhesive composition; sufficiently solidifying the portion for packaging; substantially surrounding the sufficiently solidified portion with a biodegradable plastics packaging material; the material being meltable together with the adhesive composition and blendable into said molten adhesive composition, the kind and amount of said packaging material being chosen so as not to disadvantageously affect the properties of the adhesive composition when blended into the adhesive and applied through application equipment.

DETAILED DESCRIPTION OF INVENTION

A plurality of plastic nets or film materials can be used according to this invention. The plastic net or film material must be biodegradable. One test for biodegradability is a compost test. Typically, compost piles have temperatures no more than 70° C., generally averaging 50°-60° C. and 100% relative humidity. Upon exposure times of two weeks to three months, products responsive to composting processes break down physically and are substantially consumed by microorganisms. Another test of biodegradability is described in the Sturm test. The Sturm test or ASTM 5209 measures $CO_2$ evolution and is described below:

ASTM 5209 is a test method which is performed by placing a sample of the test polymer into a flask containing sewage sludge as the bacterial source. The test samples are inserted into a flask containing sewage sludge. Through this flask, air containing no $CO_2$ is passed through the flask. The $CO_2$ free air flows through the test flask and into a second flask containing $BA(OH)_2$. Thus, any $CO_2$ generated in the flask containing a polymer sample, via the metabolic activity of the bacteria feeding on the polymer sample, travels to the second flask with the resulting formation of $BA(CO_3)$. This last flask is titrated with hydrochloric acid to determine the amount of $BA(OH)_2$ remaining in solution. These titrations are done about twice a week and new fresh solutions are then put into place.

The amount of carbon dioxide generated over a period of time is indicative of the rate of degradation of the polymer. An example of acceptable $CO_2$ generation for polycaprolactone is a generation of 300 milligrams over a 15 day period. However, the amount of $CO_2$ differs for different polymers. Other tests of biodegradability are envisioned and come within the scope of this invention.

The film material must also be capable of creating a homogeneous mixture with the molten adhesive, which significantly decreases the tendency of the film to gel or char during application. The film should also not adversely affect the viscosity of the molten adhesive mixture. Many adhesive systems have narrow windows of permissible viscosity change and thus the molten bag must not change the viscosity in any appreciable manner.

A preferred film for the present invention is a polycaprolactone film. The polycaprolactone film exhibits compatibility in hot melts containing functionalities such as hydroxyl, acidic or other common functionalities exhibited in hot melt systems. By compatibility it is meant the film is substantially miscible and does not separate from the adhesive after the packaged adhesive is heated.

Polymers such as EVA, polyethylene, polypropylene, EMA, ENBA, ENBACO, may be blended with the polycaprolactone film. However, the additions of such polymers will slow the degradation process down. In fact, for compositions of less than about 70-80% polycaprolactone, no appreciable degradation will occur. Tackifiers and plasticizers can be blended with polycaprolactone. Tackifiers include rosin acids, rosin esters, terpene phenolics, acetophenone formaldehyde, as well as those stated below. Plasticizers include castor oil, epoxidized soybean oil, benzoate plasticizers, as well as those stated before.

Specific examples of polycaprolactone films include films of between 5 $\mu$m and 200 $\mu$m, preferably between 15 $\mu$m and 50 $\mu$m thickness, depending on available dispensing equipment; such films being especially useful for packaging low softening point adhesive composition pillows batchwise into, say, 5 lb. bags with subsequent compression to remove air. More specifically, a polycaprolactone film is cast or blown from a resin available under the trademark Tone ®, commercially available from Union Carbide Chemicals & Plastics Company, Inc. The polycaprolactone in blown film form is commercially available from Bio Industries. Other polycaprolactone films include those made by Interox such as Capa 650.

Other polymers useful for the present invention include copolymers of hydroxybutyric acid and hydroxyl acid, which is made by bacteria. A related polymer, polyhydroxybutyrate, is also useful. Other bacteria created polymers may also be used, including biodegradable classes of polyesters made by bacteria in biosynthetic processes including polyhydroxybutyrate, polyhydroxy valerate and copolymers made thereof, such as Biopol ®, commercially available from Imperial Chemical Industries. Other polymers include hydrophobic polymers such as polylactic acid, polylactides, polycyano acrylate, polyortho esters, polyanhydrides, polyacetals, polyketals, polyamides, hydrophilic polymers such as poly hydroxy ethyl methacrylate, polyglutamic acid, water soluble polymers such as poly vinyl pyrrolidone, polyacrylamide, poly acrylic acid, poly ethylene glycol, hydrogels such as cross-linked polymers of HEMA with methoxy ethylmethacrylate or methyl methacrylate, naturally occurring polymers containing starch and modified starch, cellulose and its derivatives, cross-linked proteins, syntheticpolypeptide based polymers and gelatin.

The films of the present invention need not be comprised of a 100% of the biodegradable polymer to come within this invention. Mixtures of the biodegradable film of the present invention with other polymers is permissible. Mixtures of above about 70-80% of a biodegradable polymer and remaining percent being a second or a plurality of polymers is permissible as long as the overall film is still compatible with the adhesive. Polymers suitable for mixing include ethylene based polymers such as ethylene/vinyl acetate, ethylene acrylate, ethylene methacrylate, ethylene methyl acrylate, ethylene methyl methacrylate, high and low density polyethylene, polyethylene blends and chemically modified polyethylene, copolymers of ethylene and 1-6 mono- or di-unsaturated monomers, polyamides, polybutadiene rubber, polyesters such as polyethylene terephthalate, polybutylene terephthalate; thermoplastic polycarbonates, atactic poly-alpha-olefins, including atactic polypropylene, and others; thermoplastic polyacrylamide, pollacrylonitrile, copolymers of acrylonitrile and other monomers such as butadiene styrene; polymethyl pentane, polyphenylene sulfide, aromatic polyurethanes; styrene-acrylonitrile, acrylonitrile-butadiene-styrene, styrene-butadiene rubbers, polyethylene terephthalate, acrylonitrile-butadiene-styrene elastomers, polyethylene sulfide, A-B, A-B-A, A-(B-A)$_n$-B, (A-B)$_n$-Y block copolymers wherein the A comprises a polyvinyl aromatic block, the B block comprises a rubbery midblock which can be partly hydrogenated, and mixtures of said substances, but other similar materials can be used as well, to match the properties of the adhesive packaged.

The biodegradable polymers of the present invention may also be blended with tackifiers and plasticizers. Such tackifiers and plasticizers useful for blending include those disclosed below.

In any case, it is advantageous to restrict the amount of packaging material used to between 0.1 and 10% by weight and preferably 0.2 to 0.5% with respect to the weight of the adhesive composition contained in the package. This prevents undue dilution and corresponding modification of the adhesives' characteristics.

The biodegradable envelope containing the discrete adhesive units is made of a material that, when blended into the adhesive, does not substantially negatively influence the adhesive characteristics, and preferably is either a component of the adhesive or is a component physically and chemically compatible with the adhesive in the melt prior to application. The polymer should not cause a physical phasing or separation of the adhesive, and should not reduce adhesive properties.

HOT MELT ADHESIVE SYSTEMS

Briefly, thermoplastic synthetic resin materials used in hot melt adhesives comprise a variety of polymerized material. These polymers are blended with other ingredients such as plasticizers, tackifiers and extenders, to form an adhesive. Such polymers include polyethylene, polypropylene, polyvinyl acetate, polyvinyl butyryl, polyvinylalcohol, ethylene-vinylalcohol polymers and other polyvinyl resins; polystyrene resins, A-B-A block copolymers comprising polymers wherein A is a polystyrene block and B is a rubbery midblock section, acrylic and methacrylic acid ester resins; blocked polyesters/ethers and amides/ethers; various other materials compounded from synthetic resins such as polyisobutylene, polyamides, cumarone-indene products and silicones. Such thermoplastic resins usually have permanent solubility and fusability so that when hot, they can flow or creep under stress and soften to some extent to form a bond. After cooling, the materials preferably resist creep and bond deformation. They are used in the manufacture of tape, safety glass, shoe cements, for the bonding or lamination of film, foil or non-woven laminates, metals, woods, rubber, paper and many other materials.

Briefly, thermosetting resin adhesives comprise a variety of phenol-aldehyde, urea-aldehyde, melamine-aldehyde, and other condensation polymerization materials including polyepoxy, polyurethane and silicone resins. Thermosetting resins are characterized by being converted to insoluble and infusible materials, sometimes by means of either heat or catalytic action. Thermosetting adhesive compositions include epoxies, urethanes, silicones, phenolics, resorcinol, urea, melamine, formaldehyde, phenol-furfuraldehyde, and the like and are used for the bonding of wood textiles, paper, plastics, rubber, automotive, and appliance assembly and many other end uses.

Briefly, the adhesives of the natural and bitumen group consist of those made from asphalt, shellac, rosin and its esters, and similar materials. They are typically used for bonding of various materials including minerals, linoleum and the like.

THERMOPLASTIC POLYMERS

The thermoplastic base polymer that can be used in the manufacture of the novel adhesive of the invention are thermoplastic polymers that are sufficiently compatible with tackifiers, plasticizers, and other thermoplastic or thermosetting components to form a substantial homogeneous melt and solid. Typically in these adhesives, after application, the polymer provides mechanical and cohesive strength.

Any of a variety of available thermoplastic materials can be used in the compositions of the invention. Examples of such thermoplastics are ethylene based polymers such as polyethylene and its co- and terpolymers, ethylene/vinyl acetate, ethylene acrylate, ethylene methacrylate, ethylene methyl acrylate, ethylene methyl methacrylate, copolymers of ethylene and 1–6 mono- or di-unsaturated monomers etc., polyamides, polybutadiene rubber, polyesters such as polyethylene terephthalate, polybutylene terephthalate, polyester/polyether, etc., thermoplastic polycarbonates, atactic poly-alpha-olefins, including atactic polypropylene, and others; thermoplastic polyacrylamide, polyamide/polyether, polyacrylonitrile, copolymers of acrylonitrile and other monomers such as butadiene, styrene, etc., polymethyl pentane, polyphenylene sulfide, aromatic polyurethanes; styrene-acrylonitrile, acrylonitrile-butadiene-styrene, styrene-butadiene rubbers, polyethylene terephthalate, acrylonitrile-butadiene-styrene elastomers, polyphenylene sulfide. Also, A-B, A-B-A, A-(B-A)$_n$-B, (A-B)$_n$-Y block copolymers wherein the A comprises a polyvinyl aromatic block, the B block comprises a rubbery midblock which can be partly hydrogenated, and others can be used. The aromatic character of the polymers provides compatibility with the aromatic plasticizing agents discussed below and provides controlled compatibility with the tackifier or the tackifier blends used to control modules in the-adhesive compositions. The preferred polymers should have a molecular weight sufficient that, when used in an adhesive formulation, the adhesive can maintain a high cohesive strength.

Preferred polymers for use in the adhesives of this invention comprise EVA, APP, linear A-B-A block, linear A-(B-A)$_n$-B multiblock copolymers, and radial or teleblock copolymers of the formula (A-B)$_n$-Y wherein A comprises a polystyrene block, B comprises a substantially rubbery polybutadiene or polyisoprene block, Y comprises a multivalent compound, and n is an integer of at least 3. The midblocks can be post-treated to improve their heat stability through hydrogenation or other post-treatment removing residual unsaturation. We believe that the size and the amount of the A or end blocks in the A-B-A block of copolymer structure should be as much as 15–51 wt-% of the polymer.

While the total styrene content of the polymers can be as much as 51 wt-% of the polymer, and since the polymers can have more than two A blocks for improved performance, the largest A block should be less than or equal to about 20 wt-% of the polymers, and, most preferably, is less than or equal to 15 wt-% of the polymer. In an S-B-S (styrene-butadiene-styrene) copolymer, the preferred molecular weight is about 50,000 to 120,000, and the preferred styrene content is about 20 to 35 wt-%. In an S-I-S (styrene-isoprene-styrene) copolymer, the preferred molecular weight is about 100,000 to 150,000 and the preferred styrene content is about 14–30 wt-%. Hydrogenating the butadiene midblocks produces rubbery midblocks that are typically considered to be ethylene-butylene midblocks.

Such block copolymers are available from Shell Chemical Company, Enichem, Fina and Dexco. Multiblock or tapered block copolymers (the A-(B-A)$_n$-B type) are available from Firestone under the STEREON 840A and 845 trademarks.

Another usable polymer is available under the trade name TUFPRENE A from Asahi, Japan.

The adhesive compositions of the invention can contain other compatible polymers, fillers, pigments, dyes, oils, catalysts, inhibitors, antioxidants, UV absorbers, waxes, and other conventional additives.

TACKIFYING RESIN

The adhesives of the invention can contain a tackifying resin in combination with a thermoplastic block copolymer optionally with a plasticizer or other components.

Tackifying resins useful in the adhesives of the invention comprise rosin derivatives including wood rosin, tall oil, tall oil derivatives, rosin ester resins, natural and synthetic terpenes and aliphatic aromatic or mixed aliphatic-aromatic tackifying resins. Aromatic monomers useful in forming the aromatic containing resin compositions of this invention can be prepared from any monomer containing substantial aromatic qualities and a polymerizable unsaturated group. Typical examples of such aromatic monomers include the styrenic monomers, styrene, alphamethyl styrene, vinyl toluene, methoxy styrene, tertiary butyl styrene, chlorostyrene, etc., indene monomers including indene, methyl indene and others. Aliphatic monomers are typical natural and synthetic terpenes which contain $C_6$ and $C_5$ cyclohexyl or cyclopentyl saturated groups that can additionally contain a variety of substantial aromatic ring substituents. Aliphatic tackifying resins can be made by polymerizing a feed stream containing sufficient aliphatic monomers such that the resulting resin exhibits aliphatic characteristics. Such feed streams can contain other aliphatic unsaturated monomers such as 1,3-butadiene, cis-1,3-pentadiene, trans-1,3-pentadiene, 2-methyl-1,3-butadiene, 2-methyl-2-butene, cyclopentadiene, dicyclopentadiene, terpene monomer, terpene phenolic resins and others. Mixed aliphatic aromatic resins contain sufficient aromatic monomers and sufficient aliphatic monomers and optionally other $C_3$-$C_8$ unsaturated monomers to produce a resin having both aliphatic and aromatic character. The article by Davis, "The Chemistry of $C_5$ Resins," discusses synthetic $C_5$ resin technology.

Representative examples of such aliphatic resins include hydrogenated synthetic $C_9$ resins, synthetic branched and unbranched $C_5$ resins, synthetic branched and unbranched $C_5$ resins and mixtures thereof. Representative examples of such aromatic tackifying resins include styrenated terpene resins, styrenated $C_5$ resins or mixtures thereof. The selection of tackifying resins is often based on the nature of the B or midblock radial block copolymer. Rosin derivatives are best for S-I-S/S-B-S blends and can be used with either S-I-S or S-B-S alone. Hydrogenated $C_9$ or straight aliphatic resins are preferred for S-I-S copolymers. For S-B-S copolymers, styrenated terpenes or rosin esters are preferred.

The adhesive compositions of the invention can contain rosin and rosin derivatives as a tackifying agent. Rosin is a solid material that occurs naturally in the oleo rosin of pine trees and typically is derived from the oleo resinous exudate of the living tree, from aged stumps and from tall oil produced as a by-product of kraft paper manufacture. After it is obtained rosin can be treated by hydrogenation, dehydrogenation, polymerization, esterification, and other post treatment processes. Rosin is typically classed as a gum rosin, a wood rosin, or as a tall oil rosin which indicates its source. The materials can be used unmodified, in the form of esters of polyhydric alcohols, and can be polymerized through the inherent unsaturation of the molecules. Materials are commercially available and can be blended into the adhesive compositions using standard blending techniques. Representative examples of such rosin derivatives include pentaerythritol esters of tall oil, gum rosin, wood rosin, or mixtures thereof.

Specific examples of useful tackifying resins that can be compatible with a variety of thermoplastic resins or thermosetting resins used in the adhesives of the invention include materials such as natural and modified rosins, glycerol, and pentaerythritol esters of natural and modified rosins, copolymers and terpolymers of natural terpenes, polyterpene resins having a softening point as determined by ASTM method E28-58 T, of from about 80° C. to 150° C., phenolic modified terpene resins and hydrogenated derivatives thereof; aliphatic petroleum hydrocarbon resins having a ring and ball softening point of from about 70° C. to 135° C., aromatic petroleum hydrocarbon resins and hydrogenated derivatives thereof and alicyclic petroleum hydrocarbon resins and the hydrogenated derivatives thereof.

PLASTICIZERS

A plasticizer is broadly defined as a typically organic composition that can be added to thermoplastics, rubbers and other resins to improve extrudability, flexibility, workability, or stretchability. Typical plasticizers in adhesives are plasticizing oils that are liquid at typical ambient temperature. The plasticizer used in the adhesives of the invention can also be typically a solid composition at ambient temperature having a softening point of at least 45° C. Preferably, the solid plasticizer is a composition with a softening point of at least 60° C. Increased softening points (60°-130° C.) can aid in improving heat resistance or preventing bond failure at high temperatures.

Plasticizing oils are used in the construction/elastic attachment/pressure sensitive adhesives of the invention. Such oils are primarily hydrocarbon oils low in aromatic content. Preferably the oils are paraffinic or naphathenic in character. The oils are preferably low in volatility, are clear and have as little color and odor as possible. The use of a plasticizing oil of this invention also contemplates the use of olefin oligomers, low molecular weight polymers, vegetable oils and their derivatives and similar plasticizing liquids.

One useful class of plasticizers used in the invention comprises a cyclo-aliphatic or aromatic ester of a benzene dicarboxylic acid. Such plasticizers are prepared by forming an ester from a cyclo-aliphatic or aromatic alcohol such as cyclohexanol, phenol, naphthol, or other monohydroxy alcohol compounds having from 5 to 12 carbon atoms. The ester compounds are formed from dicarboxylic acid compounds, typically phthalic acids. Phthalic acids that can be used in the plasticizers are 1,2-benzene dicarboxylic acid, 1,3-benzene dicarboxylic acid (isophthalic acid), or 1,4-benzene dicarboxylic acid (terephthalic acid). The preferred plasticizers of this class comprise dicyclohexyl phthalate or diphenyl phthalate. Most preferably, dicyclohexyl orthophthalate is used.

A second class of useful plasticizers comprise an aromatic carboxylic acid ester of a polyfunctional alcohol having 1 to 10 hydroxyl groups. Polyfunctional alcohols that can be used in the compositions of this class of plasticizers include compounds having at least two hydroxyl groups and at least two carbon atoms in the molecule. Specific examples of preferred hydroxy compounds include ethylene glycol, propylene glycol, 1,2-butylene glycol, 1,4-butylene glycol, glycerine, glucose, fructose, sucrose, mannitol, trimethylol ethane, 1,4-cyclohexane dimethanol, pentaerythritol, 2,2-dimethyl-1,3-propane diol, 2-hydroxy methyl-2-methyl-1,3-propane diol, neopentyl glycol, and other useful polyfunctional hydroxyl compounds. Aromatic acids that can be used with the polyfunctional alcohols to form this class ester plasticizer compounds of the invention include aromatic carboxylic acids, typically having at least one aromatic group and at least one carboxyl function. Representative acids include benzoic acid, naphthanoic acid, and 4-methyl benzoic acid. Typical examples of such useful plasticizers include triethylene glycol tribenzoate, trimethylol ethane tribenzoate, glycerol tribenzoate, sucrose benzoate, pentaerythritol tetrabenzoate, 2,2-dimethyl-1,3-propane diol dibenzoate, triethylene glycol dibenzoate, glycerol tribenzoate, 2-hydroxymethyl-2-methyl-1,3-propane diol tribenzoate, pentaerythritol tetrabenzoate, neopentyl glycol dibenzoate, mixtures thereof and others.

A preferred plasticizer is a solid with a softening point above 60° C. which belongs to the class of plasticizers including cyclohexane dimethanol dibenzoate compounds. A 1,4-cyclohexane dimethanol dibenzoate (containing cis- and trans- isomers) is exemplified and produces the maximum control over variation and change in adhesive physical properties.

A third class of useful plasticizers for use in the invention comprise a sulfonamide class made from aromatic sulfonic acids. Such plasticizers generally fall within the structural formula:

R-Ar-SO$_2$-NR$_2$ wherein each R is independently selected from the group consisting of hydrogen, aliphatic and cyclo-aliphatic radicals having 1 to 12 carbon atoms. Each R can be typically hydrogen, methyl, ethyl, propyl, isopropyl, n-butyl, isobutyl, tertiary butyl, ethyl hexyl, neopentyl, cyclohexyl, deodecyl etc. R is preferably methyl, ethyl or cyclohexyl. Such sulfonamide plasticizers can also be used in the form of a resinous material formed through the condensation of formaldehyde with said sulfonamide plasticizer.

We have found the A-B-A block copolymer, A-B-A-B-A-B multiblock copolymer and radial block copolymer thermoplastic resins can be used in a variety of useful adhesives. Such adhesives are disclosed in Collins, U.S. Pat. No. 4,136,699 which teaches a particular blend of A-B-A copolymer terpene or synthetic terpene tackifying resin and oil for use in the preparation of disposable articles. In addition, the following adhesives can be useful in the invention:

TABLE I

Low Polymer Resin Compositions

|  | Useful | Preferred | Most Preferred |
|---|---|---|---|
| Plasticizing Oil | 5–75 | 10–60 | 40–50 |
| Tackifier | 25–95 | 30–90 | 35–65 |
| Polymer | 0–15 | 0–12 | 0.1–10 |

TABLE II

|  | Useful | Preferred | Most Preferred |
|---|---|---|---|
| Solid Plasticizer | 5–70 | 10–50 | 20–30 |
| Tackifier | 20–85 | 30–75 | 35–65 |
| Polymer | 10–55 | 12–35 | 15–30 |

TABLE III

|  | Useful | Preferred | Most Preferred |
|---|---|---|---|
| Radial block copolymer* | 5–14 | 7–13 | 8–12 |
| A-B-A block copolymer* | 0–14 | 0–12 | 0–10 |
| Tackifier | 45–85 | 50–80 | 55–75 |
| Plasticizing Oil | 5–35 | 6–30 | 8–20 |
| Synthetic polyethylene wax (or other oil complexing agent) | 0–10 | 0.1–9 | 0.25–5 |

*Total polymer content (including both radial block and linear block polymer) is typically about 15 wt-% or less of the adhesive.

Such hot melt adhesive materials based on A-B-A or other types of block copolymers can be made into pillows and can be packaged with coextrusion coating made from the A-B-A or other block copolymer technology. Since the coextruded coating will comprise from about 0.1 to about 5 wt-% of the total adhesive mass, the amount of block copolymer used in formulating the adhesive pillow can be reduced and can be added to the melt in the form of the coextrusion coating. Such technology is taught in U.S. Pat. Nos. 4,054,632 and 3,723,035 and is herein incorporated by reference.

One part and two part polyurethane adhesive materials can be used in preparation of the adhesives of the invention. Such materials are disclosed in U.S. Pat. No. 4,412,033 and 4,390,678 found in the table set forth below.

Such adhesives rely on the reactivity between a polyol and a urethane prepolymer wherein the isocyanate groups condense with hydroxyl groups and prepolymer. Other types of urethane materials including hydroccuring or moisture curing urethane adhesives can be used in the invention. Additionally, two part urethane adhesives wherein the isocyanate material is formulated and manufactured in separate pillows from the polyol material can be made.

Additionally, one part urethane adhesives having substantial proportions of thermoplastic polymers can be used in the adhesives of the invention. Such adhesives are disclosed in the following tables.

TABLE IV

|  | Typical Adhesive Parts by Weight | Preferred Most Adhesive Parts by Weight | Preferred Adhesive Parts by Weight |
|---|---|---|---|
| Thermoplastic Polymer | 1–200 | 20–175 | 20–150 |
| Isocyanate Terminated Prepolymer | 100 | 100 | 100 |

TABLE IV-continued

|  | Typical Adhesive Parts by Weight | Preferred Most Adhesive Parts by Weight | Preferred Adhesive Parts by Weight |
| --- | --- | --- | --- |
| Tackifying Resin | 1–200 | 20–200 | 40–135 |

In the practice of the present invention, the adhesive composition, e.g. a hot melt adhesive, is prepared by mixing polymer, synthetic or natural resin, wax or paraffin and other substances as desired and well-known in the art, this mixing or blending being carried out at elevated temperatures and by customary methods.

The adhesive composition is then pumped to an orifice for dispensing. Usually, a coating with a separating anti-stick substance will be provided, and the coated composition will be pre-cooled prior to dispensing.

In a preferred embodiment of this invention, the dispensed composition is squeeze-cut, and thus separated into individual, pillow-shaped portion pieces. At this stage, the composition is already partly solidified, i.e. the individual pieces are sufficiently solidified at their outside, but they are able to be squeeze-cut and still retain their pillow-like shape afterwards, although the interior of the pillows may still be fairly hot and liquid.

The pillows are thereafter placed in a cooling bath, usually with water as a cooling liquid and are sufficiently solidified for packaging. At this stage, the heat remaining in the pillows can be adjusted by suitable choice of cooling time, to keep the pillows warm enough for deformation in a subsequent compression step.

The sufficiently solidified pillows are now conveyed to a packaging station, e.g. a bagging machine and are placed into nets or bags of biodegradable film packaging material according to this invention. For packaging the customary coated hot melt pillows, it is presently preferred to produce bags from a blown film of polycaprolactone with about a 0.7 mil.–2.6 mil. thickness, each bag taking about 1000 grams of pillows.

Each filled bag is then sealed by a weld seam. At this stage, the bag contains a fairly loose filling of relatively stiff pillows and a corresponding amount of air.

If necessary, in order to reduce the initially mentioned problems in subsequent use of low softening point adhesive composition pillows packaged according to this invention, the bag can be put in a press and compressed as well as compacted at elevated pressure and temperature, or it can be simply stacked with other, similar bags under sufficient heat, so that the compression is effected by the weight of the stack. In the latter case, the heat can be provided by either placing the stacks in a correspondingly heated room or by allowing the pillows to retain sufficient internal heat in the cooling process, this heat then resoftening the solidified outer regions of each pillow after the packaging.

In another preferred embodiment, the hot melt adhesive will be extruded from an extruder provided with suitable cooling means, the adhesive having a temperature of between about 50° C. and 60° C. upon extrusion. The adhesive is extruded directly into a bag or sack of the film material according to the invention. Polycaprolactone films have melting points of about 60° C., thus, when using polycaprolactone extruded adhesive should be less than about 60° C. The adhesive can be cut after extrusion and before packaging, but preferably, the adhesive is extruded into the packaging bag or sack without such comminution, until the desired amount of adhesive is received in the package. At this stage, the extruded adhesive is cut off, the package is sealed and a new bag or sack is connected to the extruder for filling.

In this embodiment, the extrusion temperature of the adhesive provides sufficient plasticity and shapability of the adhesive for substantially uniformly filling the package, without leaving undesirable voids or damaging the bag or sack in the filling or packaging process.

Preferred embodiments of the invention will now be described in more detail, by reference to the following examples:

TESTING

Beaker Testing

Different films were tested for their compatibility with a hot melt adhesive, HL-1295, commercially available from H. B. Fuller and described in U.S. Pat. No. 5,024,667, (herein incorporated by reference). A film of polycaprolactone polyester (Tone® P787 commercially available from Union Carbide), a 2.5% vinyl acetate VA film (NA 420,000 commercially available from Quantum USI), 14% methacrylate EMA film (XPE 182 available from Exxon Corp.), and 28% vinyl acetate EVA film (XZA 68.0 available from Consolidated Thermoplastics Company) were tested using the HL-1295 adhesive by adding 0.5 wt-% of each film to 200 g samples of the hot melt. The beaker is layered with 4 equal layers of hot melt and film. The beakers were allowed to sit in an oven at 350° F. for 96 hours. The results were as follows:

TABLE V

| Film | Ring | Skinning | Charring |
| --- | --- | --- | --- |
| Polycaprolactone Polyester | No | No | No |
| 14% Methacrylate EMA | Yes | No | Yes |
| 2.5% Vinyl Acetate VA | Yes | Yes | Yes |
| 28% Vinyl Acetate EVA | Yes | No | Yes |

A ring formed as a result of partial skinning and charring. The ring or skin appeared after 24 hours and remained the same for 96 hours. The hot melts continued to darken. As is evident for Table V, the PCL film exhibited no ring or skinning or charring on the surface of the adhesive. Such properties results in no unwanted gelling upon exposure to heat typically present in adhesive application equipment.

Further tests were performed as follows: 199 g of an EVA/rosin ester based adhesive was placed in a glass beaker along with 1.0 g of the film. The beaker was layered with adhesive and film by placing approximately 50 g of adhesive, and 0.25 g of film in 4 layers. The beaker was then placed in an oven at 350° F. (obtained from application temperatures) and allowed to sit with no mixing for 72 hours. Observations were made during this time as to whether or not the film separated from the adhesive and whether or not the film charred or gelled. A sample of the straight adhesive with no film was used as the control. The sample with the PCL showed the same performance (i.e. no skin, char or gel or separation of film) as the control. Film samples were tested comprising the following: a 28% VA EVA sample, a 14% MA EMA sample, and a 2.5% VA EVA. The hot melt was an opaque amber color at the outset. No separation of the film was evident initially.

TABLE VI

| Film | Control | 28% VA EVA | 14% MA EMA | 2.5% VA EVA | PCL |
|---|---|---|---|---|---|
| Initial | Amber | Amber | Amber | Amber | Amber |
| 24 hours | No skin | Ring | Ring | 40% skin | No skin |

The 24 hour data refers to the amount of skinning that was evident for each of the samples. A ring refers to evidence of skin and char only around the edge of the beaker and not on the surface of the hot melt. The 28% VA EVA and the 14% MA EMA were better than the 2.5% VA EVA film but did not perform as well as the PCL which showed no difference from the control. The samples remained as they were after 24 hours up to 72 hours when they were removed from the oven. The only changes were that the samples continued to darken with age.

Blended Testing

Polycaprolactone was blended in an 80% PCL to 20% polymer or resin ratio with ethylene vinyl acetate (28% VA and 5 Melt Index which is supplied by Quantum USI and DuPont); with ethylene methylacrylate (28% MA and 3 Melt index which is XS 12.04 available from Exxon); with NA 59300 polyethylene (melt index 22 from USI Chemicals Company) and with Foral AX rosin acid (available from Hercules). These samples were made into films. Heat stabilities were run by placing 199 g of the HL-1295 adhesive and 1 g of the film in a glass beaker. The beaker is again layered with 4 equal layers of hot melt and film. The samples were placed in an oven at 350° F. with no mixing and allowed to sit for 96 hours. The samples are designated as follows:
1 HL-1295 adhesive
2 w/80% Tone P 787 and 20% EVA (28-05)
3 w/80% Tone P 787 and 20% EMA (28-03) (XS 12.04)
4 w/80% Tone P 787 and 20% polyethylene (NA 59300)
5 w/80% Tone P 787 and 20% Foral AX (rosin acid)
6 w/PCL film from Bio Industries Inc. (Tone P 787)

TABLE VII

| | #1 | #2 | #3 | #4 | #5 | #6 |
|---|---|---|---|---|---|---|
| Initial | Amber | Amber | Amber | Amber | Amber | Amber |
| 24 Hours | No skin | No skin | No skin | Ring | No skin | No skin |
| 96 Hours | No skin | No skin | No skin | Ring | No skin | No skin |

Between 24 and 96 hours, the only changes that occurred in the adhesive was that the color continued to darken. There was a ring of skin around the edge of the beaker on sample #4 at 24 hours. It is postulated this was from the polyethylene in the product. It should be noted that this sample is an improvement over a straight polyethylene film but it is not as good as the straight polycaprolactone film. All of the other samples appeared like the control (HL-1295 adhesive alone) with no skinning, charring or gelling. Thus, blends with nonbiodegradable polymers are permissible.

Viscosity Test

Viscosity tests were run, using selected samples from the Beaker Test described above. The mixtures were blended for 5 minutes with a Lightening Brand mixer at 350° F.

The following Table shows the viscosity of the molten samples:

TABLE VIII

| Brookfield viscosity (mPa.s) at 20 rounds per minute | Adhesive | PCL Adhesion | Vinyl Acetate and Adhesive |
|---|---|---|---|
| at 325° F. | 3,985 | 3,895 | 4,095 |

As is evident, the PCL does not result in (3% error for viscometer) increased viscosity and thus is compatible. Again, substantial rises in viscosity present a problem in that difficulty in mixing and adhesive application may result from a significant viscosity increase.

Peel Test

In another experiment, the above-mentioned adhesive samples from the viscosity test were coated onto a polyethylene substrate, and the adhesive properties in terms of peeling was determined by adhering the substrate onto different materials.

Fine line bonds and spray bonds were made using polyethylene to polyethylene. A simulated diaper application was used and the following conditions set:

| | Spray | Fine Line |
|---|---|---|
| Web Speed | 500 ft/min. | 715 ft/min. |
| Coat Weight | 4 mg/in$^2$ | 1.4 mg/linear inch |
| Nip Pressure | 15 psi nip press. | 15 psi |
| Application Temp. | 275° F. App. Temp. | 275° F. |

The following results were obtained:

TABLE IX

| | Average Peel Values (The average of 7-8 samples was taken samples were peeled at 20"/minute) | |
|---|---|---|
| | Packaged (PCL) | Non-Packaged |
| Fine Line | 111 ± 7 | 102 ± 10 |
| Spray | 48 ± 2 | 50 ± 3 |

Again, it is evident that the packaged adhesives show nearly identical performance to the non-packaged adhesive.

Visual Test

In yet another test, A polycaprolactone film of 1 mil. thickness and DSC softening point of 60° was used to package HL-1295 adhesive pillows into bags, following the general procedure as described above.

The adhesive-filled bags were placed in a melter/dispenser apparatus and melted and applied at 275° F. No influence of the packaging material component in the adhesive was noted in the final product.

While the present invention has been described in connection with the exemplary embodiments thereof, it will be understood that many modifications will be apparent to those of ordinary skill in the art and this application is intended to cover any adaptations or variations thereof.

What is claimed is:

1. A method of packaging and applying an adhesive composition in a biodegradable package, said method comprising the steps of:

(a) providing one substantially uniform separate portion of the adhesive composition;

(b) sufficiently solidifying said portion for packaging;
(c) selecting a biodegradable packaging material having physical characteristics which are compatible with and do not substantially adversely affect the adhesive characteristics of a molten mixture of said adhesive composition,
(d) substantially completely surrounding said sufficiently solidified portion with a biodegradable packaging material into a packaged adhesive; and
(e) heating said packaged adhesive to form a substantially homogeneous mixture and applying said homogeneous mixture to a substrate, said packaging material having properties such that no degrading of the packaging material occurs upon application.

2. The method according to claim 1, wherein the packaging material comprises polycaprolactone.

3. The method according to claim 1, wherein said packaging material comprises a blend of polycaprolactone and a second material, said second material not being biodegradable.

4. The method according to claim 1, wherein the packaging material is a polymeric net weighing between 0.1 and 5% by weight with respect to the weight of the adhesive composition contained in the package.

5. The method according to claim 3, wherein the packaging material is a bag sealed by welding after filling with the adhesive composition.

6. A method of packaging an adhesive composition in a biodegradable package, said method comprising the steps of:
(a) providing a plurality of substantially uniform separate portions of the adhesive composition;
(b) sufficiently solidifying all said portions for packaging;
(c) selecting a biodegradable packaging material having physical characteristics which are compatible with and do not substantially adversely affect the adhesive characteristics of a molten mixture of said adhesive composition,
(d) forming a batch comprising the plurality of solidified portions;
(e) substantially surrounding said batch with a biodegradable packaging material; and
(f) heating said packaged adhesive to form a homogeneous mixture and applying said homogeneous mixture to a substrate, said packaging material having properties such that no degrading of the packaging material occurs upon application.

7. The method according to claim 6, wherein the packaging material is a polymeric net weighing between 0.1 and 5% by weight with respect to the weight of the adhesive composition contained in the package.

8. The method according to claim 6, the portions being provided by separating a continuous mass of adhesive composition into roughly pillow-shaped pieces weighing between 0.1 and 50 grams.

9. The method according to claim 6, wherein the packaging material comprises polycaprolactone.

10. The method according to claim 6, wherein said packaging material comprises a blend of polycaprolactone and a second polymeric material, said second material not being biodegradable.

11. The method according to claim 6, the biodegradable packaging material having a thickness in the range between about 0.5 $\mu$m and 10 $\mu$m.

12. The method according to claim 6, wherein the biodegradable packaging material is selected from the group consisting of hydrophobic polymers such as polylactic acid, polylactides, polycyano acrylate, polyortho esters, polyanhydrides, polyacetals, polyketals, polyamides, polyesters such as polylactic acid, polylactides, water soluble polyvinyl alcohol, bacteria biosynthesized polyester, such as polyhdroxybutyrate, polyhydroxyvalerate, hydrophilic polymers such as poly hydroxy ethyl methacrylate, polyglutamic acid, water soluble polymers such as poly vinyl pyrrolidone, polyacrylamide, poly acrylic acid, poly ethylene glycol, hydrogels such as cross-linked polymers of HEMA with methoxy ethylmethacrylate or methyl methacrylate, water-soluble monomer, cross-linked with water-soluble vinyl monomers, naturally occurring polymers containing starch and modified starch, cellulose and its derivatives, cross-linked proteins, syntheticpolypeptides based polymers and gelatin.

13. A packaged adhesive composition, comprising a batch of substantially uniform separate portion pieces of adhesive composition, said batch being substantially completely surrounded by a biodegradable packaging material, said packaging material being selected such that upon heating said batch, said molten packaging material having properties such that it does not degrade upon being applied through application equipment.

14. The composition according to claim 13, the separate portion pieces being pillow-shaped and weighing between 0.1 and 50 grams.

15. The composition according to claim 13, the biodegradable packaging further comprising a polymer being selected from the group consisting of ethylene based polymers such as ethylene/vinyl acetate, ethylene acrylate, ethylene methacrylate, ethylene methyl acrylate, ethylene methyl methacrylate, high and low density polyethylene, polyethylene blends and chemically modified polyethylene, copolymers of ethylene and 1–6 mono- or di-unsaturated monomers, polyamides, polybutadiene rubber, polyesters such as polyethylene, terephthalate, polybutylene terephthalate; thermoplastic polycarbonates, atactic poly-alpha-olefins, including atactic polypropylene, and others; thermoplastic polyacrylamide, polyacrylonitrile, copolymers of acrylonitrile and other monomers such as butadiene styrene, polymethyl pentane, polyphenylene sulfide, aromatic polyurethanes, styrene-acrylonitrile, acrylonitrile-butadiene-styrene, styrene-butadiene rubbers, polyethylene terephthalate, acrylonitrile-butadiene-styrene elastomers, polyethylene sulfide, A-B, A-B-A, A-(B-A)n-B, (A-B)$_n$-Y block copolymers wherein the A comprises a polyvinyl aromatic block, the B block comprises a rubbery midblock, and mixtures of said substances.

16. The composition according to claim 13, wherein the biodegradable packaging material is selected from the group consisting of hydrophobic polymers such as polylactic acid, polylactides, polycyano acrylate, polyortho esters, polyanhydrides, polyacetals, polyketals, polyamides, polyesters such as polylacric acid, polylactides, water soluble polyvinyl alcohol, bacteria biosynthesized polyester, such as polyhdroxybutyrate, polyhydroxyvalerate, hydrophilic polymers such as poly hydroxy ethyl methacrylate, polyglutamic acid, water soluble polymers such as poly vinyl pyrrolidone, polyacrylamide, poly acrylic acid, poly ethylene glycol, hydrogels such as cross-linked polymers of HEMA with methoxy ethylmethacrylate or methyl methacrylate, water-soluble monomer, cross-linked with water-soluble vinyl monomers, naturally occurring polymers containing starch and modified starch, cellulose and its derivatives, cross-linked proteins, syntheticpolypeptides based polymers and gelatin.

17. The composition according to claim 13, wherein the packaging material comprises polycaprolactone.

18. The composition according to claim 13, wherein said packaging material comprises a blend of polycaprolactone and a second polymeric material, said second material not being biodegradable.

* * * * *

UNITED STATES PATENT AND TRADEMARK OFFICE
CERTIFICATE OF CORRECTION

PATENT NO.     : 5,387,623                                          Page 1 of 1
DATED          : February 7, 1995
INVENTOR(S)    : Ryan et al.

It is certified that error appears in the above-identified patent and that said Letters Patent is
   hereby corrected as shown below:

<u>Title page,</u>
   Item [22], Filed: "Jun. 6, 1992" should be -- Jul. 6, 1992 --

Signed and Sealed this

Twenty-fourth Day of June, 2003

JAMES E. ROGAN
*Director of the United States Patent and Trademark Office*